US011264907B2

(12) United States Patent
Aisaka et al.

(10) Patent No.: US 11,264,907 B2
(45) Date of Patent: Mar. 1, 2022

(54) MULTI-PHASE CONVERTER INCLUDING CONTROLLER TO CALCULATE ESTIMATED VALUE

(71) Applicant: DENSO CORPORATION, Kariya (JP)

(72) Inventors: Yuto Aisaka, Toyota (JP); Hirotaka Kamijo, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 5 days.

(21) Appl. No.: 16/811,521

(22) Filed: Mar. 6, 2020

(65) Prior Publication Data

US 2020/0304027 A1    Sep. 24, 2020

(30) Foreign Application Priority Data

Mar. 20, 2019    (JP) .............................. JP2019-052569

(51) Int. Cl.
| | | |
|---|---|---|
| *H02M 3/158* | (2006.01) | |
| *H02M 1/32* | (2007.01) | |
| *H02M 3/16* | (2006.01) | |

(52) U.S. Cl.
CPC .......... *H02M 3/1584* (2013.01); *H02M 1/32* (2013.01); *H02M 3/1582* (2013.01); *H02M 3/16* (2013.01)

(58) Field of Classification Search
CPC ................................................. H02M 3/1584
See application file for complete search history.

(56) References Cited

U.S. PATENT DOCUMENTS

| | | | | |
|---|---|---|---|---|
| 2009/0198460 | A1* | 8/2009 | Carroll | ............... H02M 3/1584 702/60 |
| 2015/0008935 | A1* | 1/2015 | Choi | ................... G01R 31/3271 324/537 |
| 2015/0236595 | A1* | 8/2015 | Babazadeh | ......... H02M 3/1584 323/272 |
| 2021/0028705 | A1* | 1/2021 | Ishikura | ................... H02M 1/32 |

FOREIGN PATENT DOCUMENTS

| | | |
|---|---|---|
| JP | 2016-116262 A | 6/2016 |
| JP | 2017-229123 A | 12/2017 |

* cited by examiner

*Primary Examiner* — Peter M Novak
(74) *Attorney, Agent, or Firm* — Sughrue Mion, PLLC

(57) ABSTRACT

A multi-phase converter has a plurality of voltage converter circuits connected in parallel; current sensors provided in the voltage converter circuits respectively; and a controller configured to calculate an estimated value of a total input current inputted to the multi-phase converter. The controller may be configured to output a notification signal that indicates an abnormality in one of the current sensors when a difference between a total sum of measured values of all the current sensors and the estimated value is outside a predetermined allowable range.

2 Claims, 4 Drawing Sheets

MULTI-PHASE CONVERTER INCLUDING CONTROLLER TO CALCULATE ESTIMATED VALUE

CROSS-REFERENCE

This application claims priority to Japanese Patent Application No. 2019-052569, filed on Mar. 20, 2019, the entire contents of which are incorporated herein by reference.

TECHNICAL FIELD

The technology disclosed herein relates to a multi-phase converter in which a plurality of voltage converter circuits are connected in parallel. In particular, the technology disclosed herein relates to a multi-phase converter that comprises voltage converter circuits, each include a current sensor, and comprises a controller capable of executing an abnormality detection process for the current sensors.

BACKGROUND

Japanese Patent Application Publications No. 2016-116262 and 2017=229123 each describe a multi-phase converter in which a plurality of voltage converter circuits is connected in parallel and current sensors are provided in the voltage converter circuits respectively. The multi-phase converter described in Japanese Patent Application Publication No. 2016-116262 is applied to an electric vehicle and is configured to convert DC power of a battery into driving power for a traction motor. Japanese Patent Application Publication No. 2016-116262 also describes a technology of detecting abnormality for the current sensors. The multi-phase converter described in Japanese Patent Application Publication No. 2016-116262 supplies a current to the motor such that no torque is outputted from the motor, and detects the presence or absence of abnormality for the current sensors based on comparison results between the current flowing in the motor and a current flowing in each of the voltage converter circuits.

Japanese Patent Application Publication No. 2017-229123 also describes a technology of detecting abnormality for the current sensors provided in the respective converter circuits of the multi-phase converter. Each of the converter circuits is a transformer circuit including a reactor. An abnormality detection method described in Japanese Patent Application Publication No. 2017-229123 includes calculating a voltage before boosted or a voltage after boosted of each converter circuit based on a measured value of the current sensor and an inductance of the reactor. If the voltages before boosted (or the voltages after boosted) of the converter circuits are different from each other, it is determined that abnormality is occurring in a certain current sensor.

SUMMARY

The disclosure herein provides a technology that detects abnormality in one of current sensors included in respective converter circuits of a multi-phase converter by an approach different from the technologies described in the previously cited prior art.

A multi-phase converter disclosed herein may comprise: a plurality of voltage converter circuits connected in parallel; current sensors provided in the voltage converter circuits respectively; and a controller. The controller may be configured to calculate an estimated value of a total input current inputted to the multi-phase converter. The controller may be configured to output an abnormality notification signal indicating abnormality in one of the current sensors when a difference between a total sum of measured values of all the current sensors and the estimated value is outside a predetermined allowable range. Since this multi-phase converter uses the estimated value of the total input current inputted to the multi-phase converter, even if the number of the voltage converter circuits connected to the multi-phase converter is increased, processing load on the controller is not increased much.

An example of the estimated value calculation includes dividing input power to the multi-phase converter or output power of the multi-phase converter by an input voltage to the multi-phase converter. In some cases, the output power of the multi-phase converter may be obtained from a device that is connected to an output terminal of the multi-phase converter. As an example, an inverter may be connected to the output terminal of the multi-phase converter, and a motor may be connected to an AC terminal of the inverter. The inverter includes a current sensor configured to measure a current supplied to the motor to control a rotational speed of the motor. Since a voltage of AC output from the inverter is fixed, output power of the inverter can be obtained from the current sensor provided in the inverter. That is, the multi-phase converter disclosed herein may obtain the estimated value of the total input current by using a sensor included in a device connected to the output terminal of the multi-phase converter. In this case, the cost of the multi-phase converter can be suppressed.

In a case where a fuel cell is connected to an input terminal of the multi-phase converter, target output power of the fuel cell may be used as the input power to the multi-phase converter. The fuel cell includes a voltage sensor configured to measure its output voltage. In this case, the output voltage of the fuel cell is an input voltage to the multi-phase converter, and the estimated value of the total input current is obtained by dividing input power to the multi-phase converter (the target output power of the fuel cell) by the input voltage to the multi-phase converter (the output voltage of the fuel cell). In this case, the estimated value of the total input current can be obtained based on information in a device connected to the input terminal of the multi-phase converter (which is the fuel cell, in the above case). The cost of the multi-phase converter can be suppressed in this case as well, because the number of sensors the multi-phase converter has to include is less.

When the difference between the total sum and the estimated value is outside the allowable range, the controller may be configured to identify, as the current sensor in which the abnormality occurs, one of the current sensors that provides a largest absolute value among absolute values of differences between a value obtained by dividing the estimated value by a number of the voltage converter circuits and each of the measured values of the current sensors. The current sensor in which the abnormality occurs can be identified by the simple calculation.

When the difference between the total sum and the estimated value is outside the allowable range, the controller may be configured to calculate a first value obtained by multiplying the estimated value by ((N−1)/N) (where N is a number of the voltage converter circuits) and calculate a plurality of second values obtained by subtracting each of the measured values of the current sensors from the total sum. Further, the controller may be configured to identify, as the current sensor in which the abnormality occurs, one of the current sensors corresponding to the measured value subtracted at a time of calculating the second value that provides a smallest absolute value among absolute values of differences between the first value and each of the second values. When the difference between the first value and the second value is the smallest, all the measured values of the current sensors used at the time of calculating this second value indicate correct values. Therefore, it is possible to determine that the abnormality occurs in one of the current sensors that outputs the measured value subtracted at the time of calculating the second value.

The details and further improvements of the technology disclosed herein are described in "DETAILED DESCRIPTION" below.

DETAILED DESCRIPTION

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved multi-phase converters, as well as methods for using and manufacturing the same.

Moreover, combinations of features and steps disclosed in the following detailed description may not be necessary to the practice disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
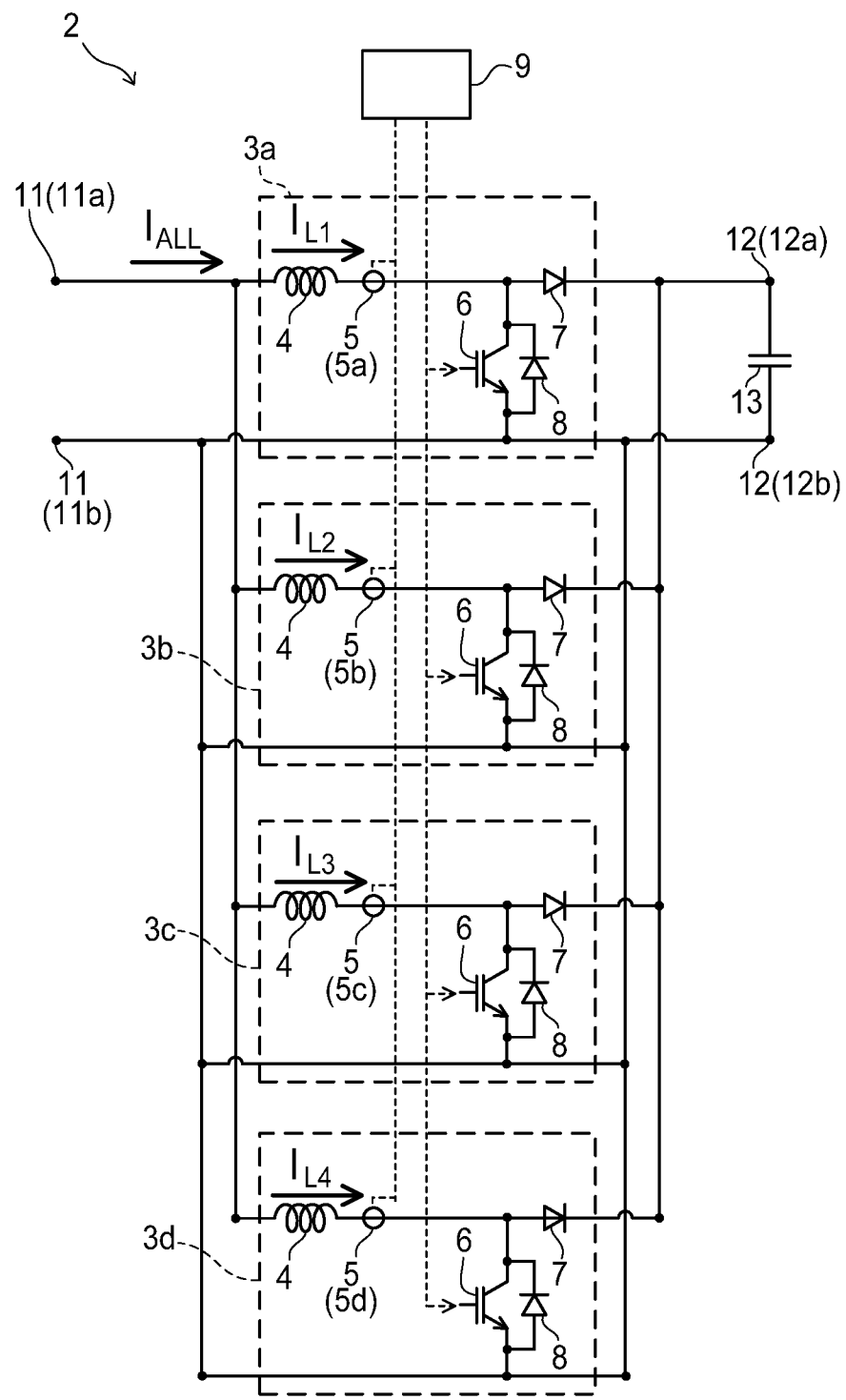
FIG. 1 is a circuit diagram of a multi-phase converter of an embodiment.

A multi-phase converter 2 of an embodiment will be described below with reference to the accompanying drawings. FIG. 1 shows a circuit diagram of the multi-phase converter 2. The multi-phase converter 2 includes four chopper-type boost converter circuits 3a to 3d and a controller 9. The four boost converter circuits 3a to 3d are connected in parallel between an input terminal 11 and an output terminal 12 of the multi-phase converter 2. Each of the four boost converter circuits 3a to 3d includes a current sensor 5 configured to measure an input current.

A configuration of the boost converter circuit 3a will be described. The boost converter circuit 3a includes a reactor 4, a switching element 6, and two diodes 7 and 8. One end of the reactor 4 is connected to a positive electrode 11a of the input terminal, while another end thereof is connected to an anode of the diode 7. A cathode of the diode 7 is connected to a positive electrode 12a of the output terminal of the multi-phase converter 2. A negative electrode 11b of the input terminal and a negative electrode 12b of the output terminal are connected directly. The switching element 6 has its collector (positive electrode) and emitter (negative electrode). The collector is connected between the reactor 4 and the diode 7. The emitter is connected to the negative electrode 11b of the input terminal (the negative electrode 12b of the output terminal). The diode 8 is connected in antiparallel with the switching element 6. By turning on and off the switching element 6, a voltage of electric power inputted to the input terminal 11 is boosted, and then it is outputted from the output terminal 12. The configuration and operation of the chopper-type boost converter circuit 3a shown in FIG. 1 are well known, and thus a detailed description thereof is omitted.

The switching element 6 is controlled by the controller 9. A dashed line connecting the controller 9 and the switching element 6 and a dashed line connecting the controller 9 and the current sensor 5 both indicate communication lines.

The current sensor 5 is connected between the reactor 4 and the diode 7. The current sensor 5 is configured to measure a current flowing through the reactor 4, that is, an input current of the boost converter circuit 3a.

The boost converter circuits 3b to 3d have the same configuration as the boost converter circuit 3a, and thus the description thereof is omitted.

A smoothing capacitor 13 is connected between the positive electrode 12a of the output terminal and the negative electrode 12b of the output terminal. The smoothing capacitor 13 is provided to remove pulsation in output voltages of the boost converter circuits 3a to 3d.

The switching elements 6 of the boost converter circuits 3a to 3d are controlled by the controller 9. The controller 9 supplies the same drive signal to the four boost converter circuits 3a to 3d. The four boost converter circuits 3a to 3d operate at the same boost ratio. As the four boost converter circuits 3a to 3d connected in parallel operate at the same boost ratio, the four boost converter circuits 3a to 3d operate as if they were one boost converter with a large capacity. The multi-phase converter 2 has a current capacity four times larger than that of the boost converter circuit 3a.

Each of the boost converter circuits 3a to 3d includes the current sensor 5. The multi-phase converter 2 has a function of detecting abnormality for the current sensors 5. For the convenience of description, the boost converter circuits 3a to 3d are hereinafter referred to as the first converter circuit 3a, the second converter circuit 3b, the third converter circuit 3c, and the fourth converter circuit 3d, respectively. Further, measured values of the current sensors 5 in the respective converter circuits are hereinafter referred to as a first measured value $I_{L1}$, a second measured value $I_{L2}$, a third measured value $I_{L3}$, and a fourth measured value $I_{L4}$, respectively. Further, to distinguish the plurality of current sensors 5 from one another, the current sensor of the first converter circuit 3a may be denoted with a reference sign 5a. Similarly, the current sensor of the second converter circuit 3b may be denoted with a reference sign 5b, the current sensor of the third converter circuit 3c may be denoted with a reference sign 5c, and the current sensor of the fourth converter circuit 3d may be denoted with a reference sign 5d.

The controller 9 is configured to be capable of estimating a total input current inputted to the multi-phase converter 2. An estimated value of the total input current is denoted with a reference sign "$I_{ALL}$". A method of obtaining the estimated value $I_{ALL}$ will be described later.

When an absolute value of a difference between a total sum of the first to fourth measured values $I_{L1}$, $I_{L2}$, $I_{L3}$, $I_{L4}$ and the estimated value $I_{ALL}$ of the total input current is outside a predetermined allowable range, the controller 9 outputs a signal that indicates abnormality in one of the current sensors 5 (abnormality notification signal) to a higher-order controller.

The controller 9 compares a value ($I_{ALL}/4$) that is obtained by dividing the estimated value $I_{ALL}$ by the number of boost converter circuits (which is "4" in this embodiment) with each of the first to fourth measured values $I_{L1}$, $I_{L2}$, $I_{L3}$, and $I_{L4}$. The controller 9 identifies, as the current sensor in which the abnormality occurs, one of the current sensors 5 that outputs the measured value that provides the largest absolute value among absolute values of differences between the value $I_{ALL}/4$ and each of the measured values. The controller 9 transmits the abnormality notification signal including an identifier of the identified current sensor 5 to the higher-order controller.

Instead of the above-described process of identifying the current sensor in which abnormality occurs, the controller 9 may identify the current sensor in which abnormality occurs as described below. The controller 9 calculates a first value that is obtained by multiplying the estimated value ($I_{ALL}$) of the total input current by ((N−1)/N). Here, N is the number of boost converter circuits, and thus in the case of the present embodiment, N=4. Then, the controller 9 calculates a plurality of second values that are obtained by subtracting each of the measured values of the current sensors 5 from the total sum of the measured values $I_{L1}$, $I_{L2}$, $I_{L3}$, and $I_{L4}$ of all the current sensors 5. These four second values are termed a 21st value=$I_{L2}+I_{L3}+I_{L4}$, a 22nd value=$I_{L1}+I_{L3}+I_{L4}$, a 23rd value=$I_{L1}+I_{L2}+I_{L4}$, and a 24th value=$I_{L1}+I_{L2}+I_{L3}$, respectively.

The 21st value is a value obtained by subtracting the measured value of the current sensor 5a (the current sensor of the first converter circuit 3a) from the total sum of the measured values of the four current sensors 5. The 22nd value is a value obtained by subtracting the measured value of the current sensor 5b from the total sum of the measured values of the four current sensors 5. The 23rd value is a value obtained by subtracting the measured value of the current sensor 5c from the total sum of the measured values of the four current sensors 5. The 24th value is a value obtained by subtracting the measured value of the current sensor 5d from the total sum of the measured values of the four current sensors 5.

The controller 9 compares the first value with each of the 21st to 24th values, and then identifies, as the current sensor in which abnormality occurs, one of the current sensors 5 of which the measured value is excluded at the time of calculating the second value that provides the smallest absolute value among absolute values of differences between the first value and each of the 21st to 24th values.

For example, when the absolute value of the difference between the first value and the 21st value is the smallest, the controller 9 identifies, as a current sensor in which abnormality occurs, the current sensor 5a of which the measured value excluded at the time of calculating the 21st value. Or, when the absolute value of the difference between the first value and the 24th value is the smallest, the controller 9 identifies, as a current sensor in which abnormality occurs, the current sensor 5d of which the measured value is excluded at the time of calculating the 24th value.

The second value (one of the 21st to 24th values) being close to the first value means that the measured values of the current sensors included at the time of calculating the second value, are correct. Therefore, the controller 9 can identify, as a current sensor in which abnormality occurs, one of the current sensors of which the measured value is excluded at the time of calculating the second value that provides the smallest difference between the first and second values.

Figure 2:
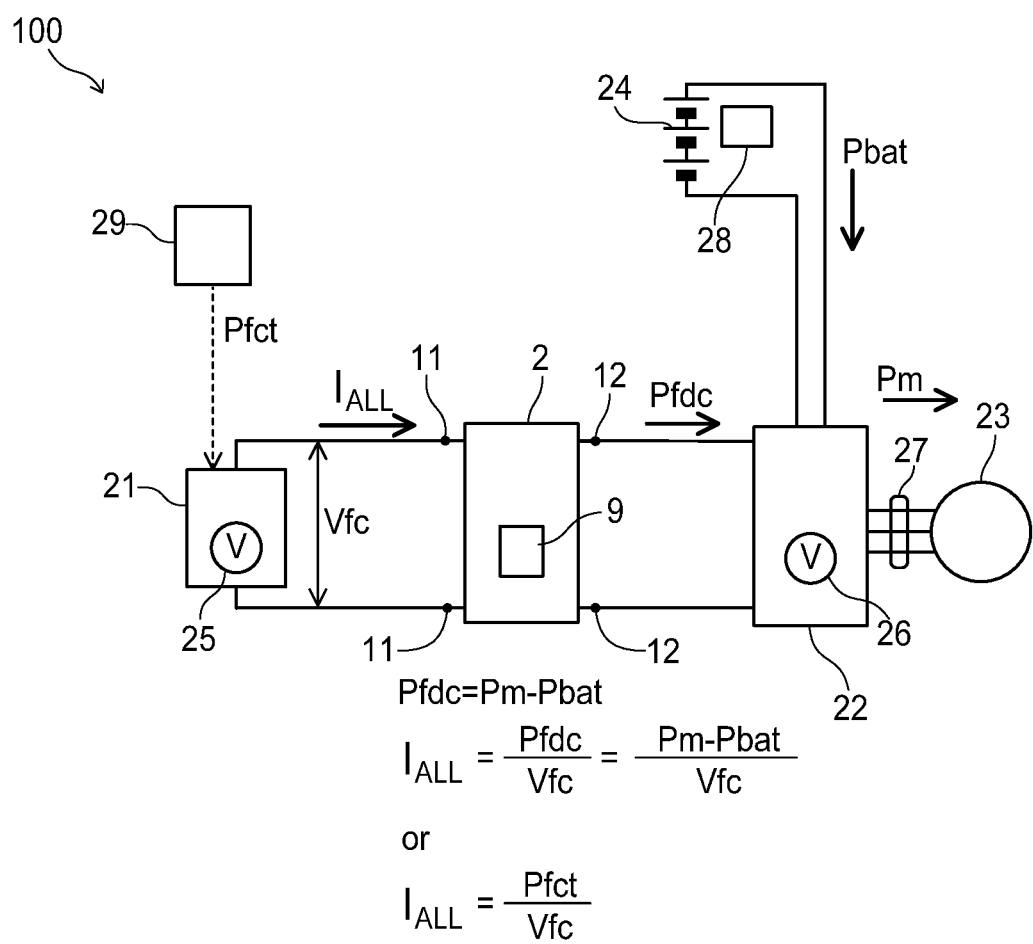
FIG. 2 is a block diagram of an electric power system in an electric vehicle, which is an application example of the multi-phase converter of the embodiment.

The multi-phase converter 2 of the embodiment is applied to an electric vehicle, for example. The application example of the multi-phase converter 2 of the embodiment will be described below. FIG. 2 shows a block diagram of an electric vehicle 100 in which the multi-phase converter 2 is used. The circuit configuration of the multi-phase converter 2 has been described with reference to FIG. 1, and thus the illustration of the circuits in the multi-phase converter 2 is omitted in FIG. 2.

A fuel cell 21 is connected to the input terminal 11 of the multi-phase converter 2. A power converter 22 is connected to the output terminal 12 of the multi-phase converter 2. A traction motor 23 is connected to AC terminals of the power converter 22.

A battery 24 is also connected to the power converter 22. The power converter 22 is configured to generate driving power for the motor 23 by using electric power boosted by the multi-phase converter 2 and electric power of the battery 24. The motor 23 is a three-phase AC motor, and the power converter 22 converts DC power of the fuel cell 21 and the battery 24 into three-phase AC power for driving the motor 23.

The fuel cell 21 receives target output power Pfct from a higher-order controller 29 and operates such that the target output power Pfct is achieved. The fuel cell 21 includes a voltage sensor 25 configured to measure an output voltage Vfc. The battery 24 includes a sensor 28 configured to measure output power Pbat.

The power converter 22 includes a voltage sensor 26 configured to measure an input voltage and a current sensor 27 configured to measure an output current. Output power Pm to the motor 23 is obtained by multiplying a measured value of the voltage sensor 26 by a measured value of the current sensor 27.

As described above, the controller 9 of the multi-phase converter 2 can obtain the estimated value $I_{ALL}$ of the total input current. The estimated value $I_{ALL}$ can be obtained by dividing output power Pfdc of the multi-phase converter 2 by an input voltage of the multi-phase converter 2. The fuel cell 21 is connected to the input terminal 11 of the multi-phase converter 2, and it includes the voltage sensor 25 that measures the output voltage Vfc. The controller 9 obtains the output voltage Vfc measured by the voltage sensor 25 and uses it as the input voltage to calculate the estimated value $I_{ALL}$.

The controller 9 can obtain the estimated value $I_{ALL}$ of the total input current by dividing the output power Pfdc of the multi-phase converter 2 by the input voltage (the output voltage Vfc of the fuel cell 21). Alternatively, the controller 9 can obtain the estimated value $I_{ALL}$ of the total input current by dividing input power of the multi-phase converter 2 by the input voltage (the output voltage Vfc of the fuel cell 21). The controller 9 may use a value that is obtained by multiplying the output voltage Vfc of the fuel cell 21 by a conversion-efficiency coefficient, as the input voltage of the multi-phase converter 2.

The output power Pfdc of the multi-phase converter 2 is obtained by subtracting the output power Pbat of the battery 24 from the output power Pm to the motor 23. As described above, the output power Pm to the motor 23 can be calculated from the measured values of the voltage sensor 26 and the current sensor 27 in the power converter 22. The output power Pbat of the battery 24 can be obtained from the sensor 28.

The controller 9 can use the target output power Pfct, which is sent by the higher-order controller 29 to the fuel cell 21, as an estimated value of the input power of the multi-phase converter 2.

As described above, the controller 9 can obtain the estimated value $I_{ALL}$ of the total input current from the information that the devices connected to the multi-phase converter 2 (the fuel cell 21, the power converter 22, the motor 23, and the battery 24) have. The multi-phase converter 2 does not require any dedicated sensor to obtain the estimated value $I_{ALL}$ of the total input current. Therefore, the multi-phase converter 2 can have the abnormality detection function for the current sensors at low cost.

Figure 3:
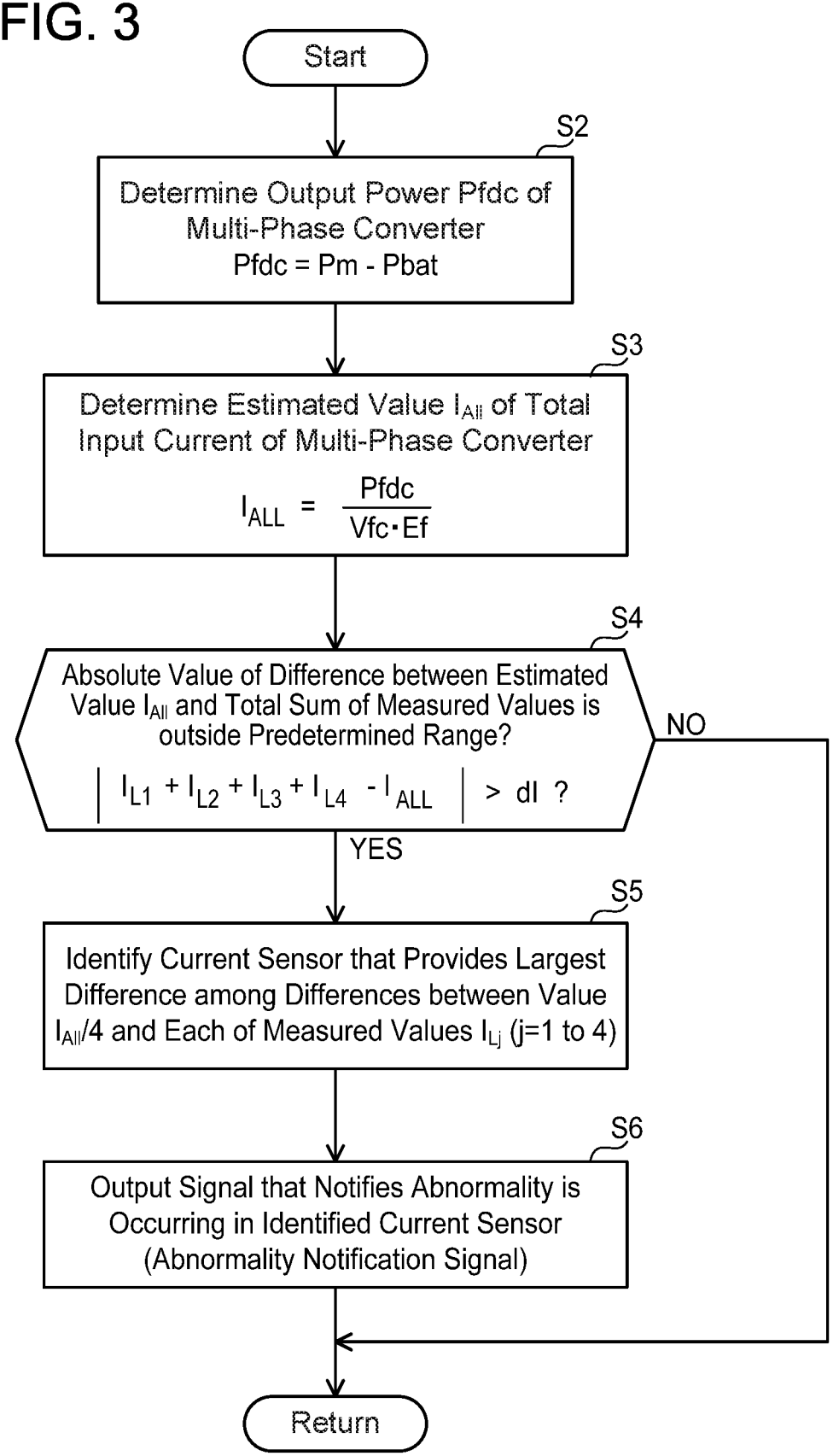
FIG. 3 is a flowchart of abnormality detection process executed by a controller of the multi-phase converter of the embodiment.

FIG. 3 shows a flowchart of abnormality detection process executed by the controller 9. The process in FIG. 3 is repeatedly executed periodically. The controller 9 determines the output power Pfdc of the multi-phase converter 2 (step S2). As described above, the controller 9 obtains the output power Pfdc by subtracting the output power Pbat of the battery 24 from the output power Pm to the motor.

Then, the controller 9 obtains the estimated value $I_{ALL}$ of the total input current to the multi-phase converter 2. Specifically, the controller 9 divides the output power Pfdc obtained in step S2 by a value that is obtained by multiplying the output voltage Vfc of the fuel cell 21 (the input voltage of the multi-phase converter 2) by an efficiency Ef (step S3).

Then, the controller 9 checks whether or not the difference between the estimated value $I_{ALL}$ and the total sum of the measured values ($I_{L1}$, $I_{L2}$, $I_{L3}$, and $I_{L4}$) of the current sensors 5 in all the converter circuits 3a to 3d is outside the predetermined range (step S4).

When an absolute value of the difference between the total sum of the measured values and the estimated value $I_{ALL}$ is within the predetermined range (step S4: NO), the controller 9 determines that all the current sensors 5 are normal and terminates the process.

On the other hand, when the absolute value of the difference between the total sum of the measured values and the estimated value $I_{ALL}$ is outside the predetermined range, the controller 9 determines that abnormality occurs in one of the current sensors 5 in the boost converter circuits 3a to 3d (step S4: YES). In this case, the controller 9 identifies, as the current sensor in which the abnormality occurs, one of the current sensors that provides the largest absolute value among absolute values of differences between a value obtained by dividing the estimated value $I_{ALL}$ by 4 (the number of the boost converter circuits) and each of the measured values $I_L$ (j=1 to 4) (step S5). Finally, the controller 9 notifies the higher-order controller 29 of an identifier of the identified current sensor and the abnormality notification signal indicating that the abnormality occurs in the current sensor represented by the identifier (step S6).

By the process shown in FIG. 3, the multi-phase converter 2 can detect abnormality for the current sensor 5.

Figure 4:
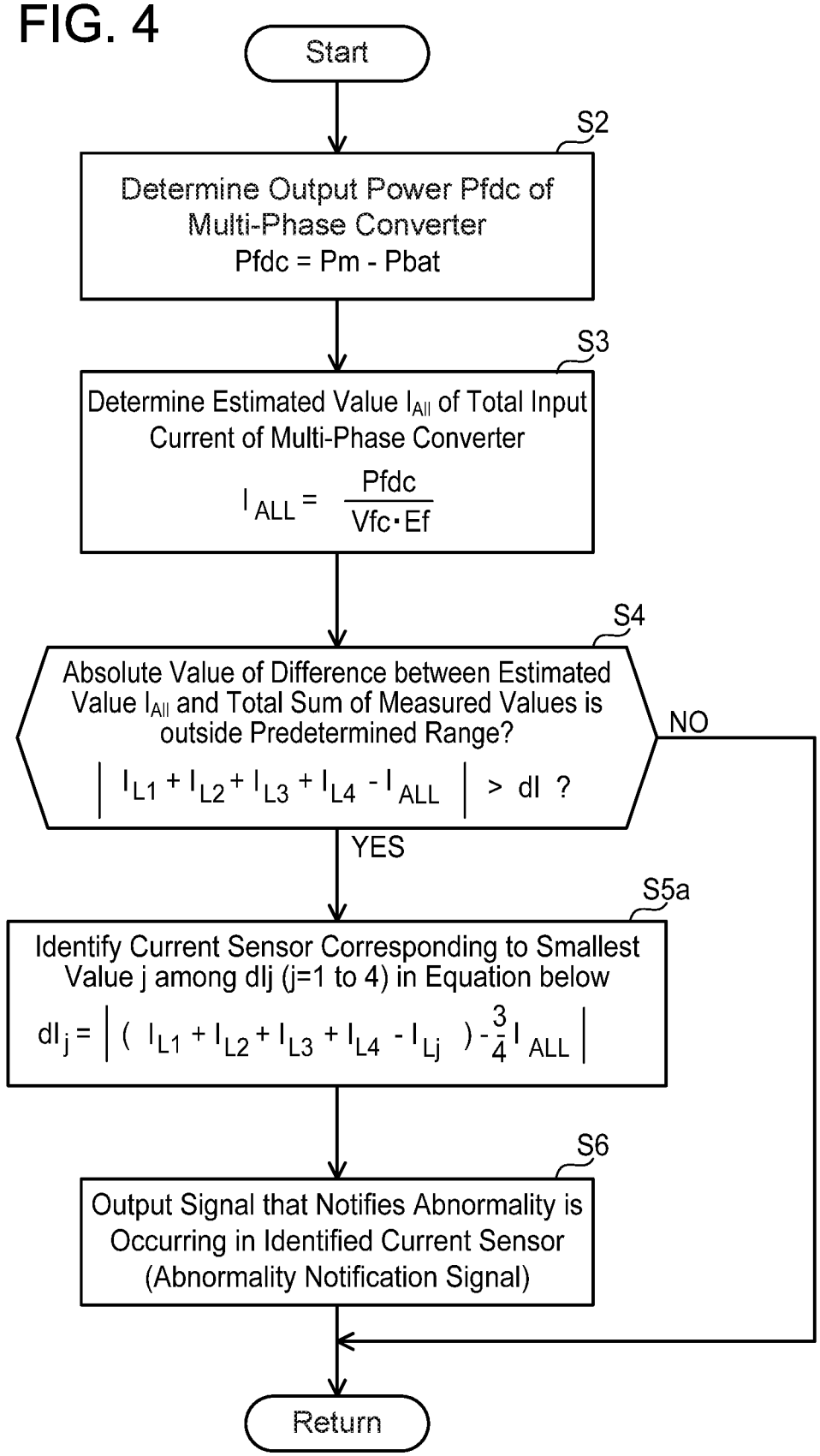
FIG. 4 is a flowchart of abnormality detection process of a variant.

FIG. 4 shows a flowchart of abnormality detection process of a variant. The flowchart in FIG. 4 includes step S5a, instead of step S5 in the flowchart of FIG. 3. Processes other than step S5a are the same as the processes in the flowchart of FIG. 3, and thus a description for the same processes is omitted.

A process in step S5a will be described. The controller 9 calculates the first value obtained by multiplying the estimated value ($I_{ALL}$) of the total input current by ((N−1)/N). Here, N is the number of the boost converter circuits, and thus in the case of the embodiment, N=4. Then, the controller 9 calculates a plurality of second values (the 21st value, 22nd value, 23rd value, and 24th value) obtained by subtracting each of the measured values of the current sensors from the total sum of the measured values $I_{L1}$, $I_{L2}$, $I_{L3}$, and $I_{L4}$ of all the current sensors 5. The controller 9 calculates absolute values dIj (j=1 to 4) of differences between each of the four second values (the 21st to 24th values) and the first value. The controller 9 identifies, as a current sensor in which abnormality occurs, one of the current sensors that outputs the measured value excluded at the time of calculating the second value that provides the smallest absolute value dIj among the absolute values dIj of the differences.

The multi-phase converter 2 of the embodiment utilizes information of other devices to obtain the estimated value $I_{ALL}$ of the total input current. Therefore, the number of sensors can be reduced. Since the information of the other devices are utilized, even if the number of boost converter circuits connected to the multi-phase converter is increased, load on the controller 9 does not increase much.

Some of technical features disclosed herein will be listed below. The technology disclosed herein is not limited to the multi-phase converter in which the plurality of boost converter circuits is connected and may be applied to a multi-phase converter in which a plurality of step-down converter circuits is connected. The technology disclosed herein can be applied to any multi-phase converter in which a plurality of voltage converter circuits is connected in parallel. The number of voltage converters connected in parallel is not particularly limited.

The voltage converter circuits connected in parallel are chopper-type voltage converters each including a reactor. Each voltage converter circuit includes the current sensor 5 configured to measure a current inputted to the voltage converter circuit. Each current sensor 5 measures a current flowing through the reactor 4. Connecting the current sensors 5 between the corresponding diodes 7 and the positive electrode 12a of the output terminal shown in FIG. 1 results in large pulsation of the measured values of the current sensors 5. With the measured values with the large pulsation, the accuracy of the abnormality detection is lowered. The measured values with less pulsation can be obtained by connecting the current sensors 5 in series with the corresponding reactors 4 which are connected to the positive electrode 11a of the input terminal of the voltage converter circuits.

What is claimed is:

1. A multi-phase converter comprising:
   a plurality of voltage converter circuits connected in parallel;
   current sensors provided in the voltage converter circuits respectively; and
   a controller configured to calculate an estimated value of a total input current inputted to the multi-phase converter, the controller configured to output an abnormality notification signal indicating abnormality in one of the current sensors when a difference between a total sum of measured values of all the current sensors and the estimated value is outside a predetermined allowable range, wherein when the difference between the total sum and the estimated value is outside the allowable range, the controller is configured to:

calculate a first value obtained by multiplying the estimated value by $((N-1)/N)$, where N is a number of the voltage converter circuits;

calculate a plurality of second values obtained by subtracting each of the measured values of the current sensors from the total sum; and identify, as the current sensor in which the abnormality occurs, one of the current sensors that corresponds to the measured value subtracted at a time of calculating the second value that provides a smallest absolute value among absolute values of differences between the first value and each of the second values.

2. The multi-phase converter of claim 1, wherein the controller is configured to calculate the estimated value by dividing input power to the multi-phase converter or output power of the multi-phase converter by an input voltage to the multi-phase converter.

* * * * *